United States Patent

Salcedo et al.

[15] 3,679,838

[45] July 25, 1972

[54] VIDEO TAPE SCANNER WITH ADJUSTABLY MOUNTED TRANSDUCERS PROVIDING CHORDAL ADJUSTMENT

[72] Inventors: Guido Salcedo, San Jose, Calif.; Jimmy J. Graves, deceased, late of Redwood City, Calif.; Marlene D. Graves, heir, Alameda, Calif.

[73] Assignee: Echo Science Corporation

[22] Filed: Feb. 19, 1970

[21] Appl. No.: 12,621

Related U.S. Application Data

[63] Continuation-in-part of Ser. No. 887,863, Dec. 24, 1969, abandoned.

[52] U.S. Cl. .......... 179/100.2 CA

[51] Int. Cl. .......... G11b 5/56

[58] Field of Search .......... 179/100.2 CA, 100.2 T; 274/4 A, 11 A

[56] References Cited

UNITED STATES PATENTS

| | | | |
|---|---|---|---|
| 3,319,015 | 5/1967 | Eccarius et al. | 179/100.2 CA |
| 3,286,041 | 11/1966 | Nishiwaki | 179/100.2 T |
| 3,020,359 | 2/1962 | Pfost | 179/100.2 T |
| 3,207,517 | 9/1965 | Tanigawa et al. | 274/4 A |

FOREIGN PATENTS OR APPLICATIONS

| | | | |
|---|---|---|---|
| 389,631 | 5/1963 | Japan | 179/100.2 CA |

*Primary Examiner*—Howard W. Britton
*Assistant Examiner*—Robert S. Tupper
*Attorney*—Fowler, Knobbe & Martens

[57] ABSTRACT

A video tape scanner having a plurality of record-reproduce heads slideably mounted on a rotatable disk. Each head is mounted on a shoe wedged between a pair of positioning blocks which are flexibly connected to respective anchoring blocks attached rigidly to the disk. A split sleeve, recessed in an opening within the rotatable disk forms the flexible connection between each positioning block and its associated anchoring block. The sleeve has a slightly tapered internal thread into which a similarly tapered screw is turned so as to flex the sleeve. By advancing or retarding the screws in both sleeves the flexure of the sleeves is changed, thereby moving the positioning blocks on both sides of the head so as to shift the position of the head which is between them.

26 Claims, 17 Drawing Figures

VIDEO TAPE SCANNER WITH ADJUSTABLY MOUNTED TRANSDUCERS PROVIDING CHORDAL ADJUSTMENT

BACKGROUND OF THE INVENTION

This application is a continuation-in-part of a prior copending application Ser. No. 887,863 and now abandoned, filed on Dec. 24, 1969.

The invention relates to video tape machines and more particularly to a manner of adjustably mounting a plurality of heads on the rotating disk of a drum type video tape machine.

In a typical drum type tape recorder tape is transported up and around the drum in a helical path relative to the drum axis. The drum includes a scanner which rotates in a plane perpendicular to the drum axis and which traces successive signal paths diagonally across the moving tape helix. In some drum type machines, the tape is wound approximately 360° or more around the drum and a single record-reproduced head is rotated within the loop of tape. In other drum type recorders the tape is wrapped less than 360° about the drum and two record-reproduce heads are rotated about the drum axis. As the tape is pulled in its helical path around the drum, the two record-reproduce heads sweep the inside of the tape helix alternately, with the engagement of the tape with the drum being over an arc which is slightly over 180° so that a given one of the heads engages the tape an instant before the other head leave the tape.

When a signal is to be recorded on the tape, that signal is synchronously switched to alternate ones of the two record-reproduce heads so that each of them shall receive the signal during the period when it engages the tape. Thus, alternate ones of the successive tracks which are recorded on the tape are produced by alternate ones of the record-reproduce heads.

When it is desired to play back the signal which had been recorded on the tape, the tape is transported past the rotating heads and each head is caused to sweep those tracks which had been recorded through it.

For proper operation of the tape machine, the two record-reproduce heads should be at a constant, predetermined angle relative to one another around the periphery of the drum. The standard angle with a two-headed machine is 180°. Whatever the angle between the two record-reproduce heads, if the tape is to be played back on a different machine than that on which it was recorded, it is essential that the playing machine have its heads located at the same relative angles as the recording machine. If the same machine is used both for recording and playback, a deviation in the location of the recorded track thus introduced will be compensated for during reproduction insofar as the same heads which have been used for recording will also be used for detecting the recorded tracks. On the other hand, if the tape on which the tracks have been recorded on one machine are played back on another machine and the heads on the two machines are not distributed precisely the same number of degrees apart on the drum, the recorded signals will not be played back properly.

Where the recorded signal represents a frame of a television picture, the difference in head alignment will become apparent upon viewing of the reproduced signal by a horizontal shift between successive horizontal strips which make up the entire frame. This is due to the fact that a typical television picture frame is made up of several horizontal strips, each formed by a single sweep of one of the heads of the drum, so that a total frame is formed during several revolutions of the drum. Thus, if the frame which was recorded by a drum whose heads were exactly 180° apart is played back by a scanner whose heads are spaced apart by a different angle, then one of these heads will be swept into engagement with the tape too soon, causing the first line on the screen to be shifted to the left. Successive lines in the same band of lines will be similarly shifted. The next series of lines, forming the band which had been recorded by the other head, will occur too late for the same reason which had caused the lines of the previous band to occur too soon. Hence, the lines in this band will be displaced toward the right of the screen from their ideal location.

One solution which has been applied to the problem of head misalignment has been the electronic delay line, which compensates for the time error which results from head misalignment. Because of the expense of electronic delay lines, efforts have been made to make scanners in such a way that the location of the heads thereon can be adjusted to the proper position. One scanner of this type features a spinning disk split radially into a plurality of segments integral with a common hub. Each segment carries a record-reproduce head and a tapered screw may be inserted between the segments to flex them apart, thereby shifting the position of the heads upon them circumferentially. A disadvantage of the split disk scanner is that the disk tends to deform about its principal plane as its segments are forced apart. Also, the splits in the segmented disk tend to increase the amount of air turbulence.

Another mechanical approach toward eliminating head misalignment errors is to make the scanner disk solid and to mount flexible head positioning devices on it so that the disk itself is not flexed or distorted by the adjusting procedure and so that its periphery is not broken. The present invention follows this approach.

The video tape scanner of the present invention includes a disk mounted for rotation about an axis and having a flat surface which is normal to that axis. A pair of transducer assemblies are slideably mounted on the flat surface of the disk at diametrically opposite points at its periphery. To permit precise adjustment of a transducer assembly upon the disk surface at least one flexible positioning device is placed immediately adjacent the transducer assembly. It includes a first member rigidly anchored to the disk and a second member which is in contact with the transducer assembly. The second member is integrally connected to the first for movement along a chord on the disk surface when the flexure of the positioning device is altered by means provided for that purpose. Preferably, each transducer assembly is wedged between a pair of positioning devices. This arrangement has the advantage of permitting positive adjustment of each transducer assembly in both directions along a chord of the disk.

It is one of the advantages of the present invention that the positioning of the transducer assembly results in a chordal movement. The reason why this is advantageous is that, preferably, the tip of the record-reproduce head is parallel to the periphery of the disk so that, as the head wears, the point at which its gap contacts the tape does not shift. Therefore, it is desirable when adjusting the position of the transducer assembly, and the record-reproduce head mounted thereon, to do so by shifting the assembly along a chord of the disk so that the gap of the record-reproduce head remains perpendicular to the periphery of the disk. It is one of the features of the present invention that the positioning device embodied therein provides a pivot axis for the movable member of the positioning device, this pivot axis being spaced from the surface of the scanner disk, thus allowing the movable member to swing about the pivot axis along a chord of the disk.

The advantages of chordal movement about a pivot axis spaced from the surface of the disk are achieved in accordance with a feature of the invention by a positioning device formed of a sleeve split along part of its length into a fork whose prongs are integrally connected to a pair of blocks. The sleeve is seated in a recess in the disk and one of its blocks is rigidly anchored to the disk. The other block of the sleeve is free to move and is immediately adjacent to one side of the transducer assembly. The sleeve has a slightly tapered internal thread into which a similarly tapered screw may be turned. As the screw is turned, the prongs of the fork formed by the split sleeve are spread apart and the unanchored block is moved along a chord on the surface of the disk about a pivot axis defined by the unsplit end of the sleeve seated within the recess in the disk. A similar arrangement is provided on the opposite side of the transducer assembly so that it may be shifted in both directions along a chord upon the surface of the disk by adjusting the screws in the two positioning devices.

The present invention and its advantages will be more clearly understood with reference to the following description of a preferred embodiment thereof taken in conjunction with the accompanying drawings in which.

Figures 5, 8:
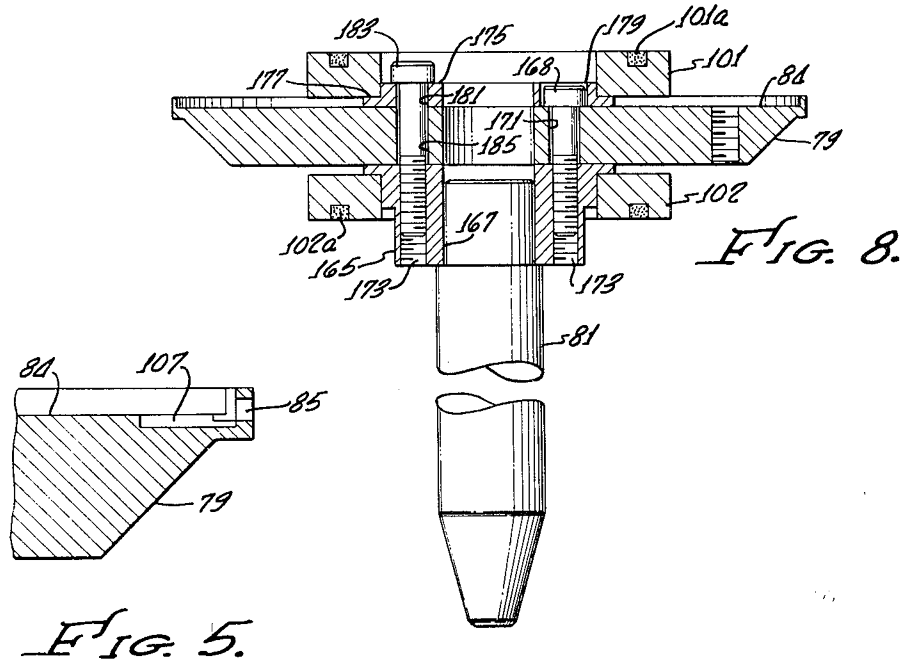
FIG. 5 is an enlarged sectional view taken along line 5—5 of FIG. 4 showing the peripheral opening in the rim around the scanner disk through which the record-reproduced head of one of the transducer assemblies protrudes for engagement with the tape.
Figure 9:
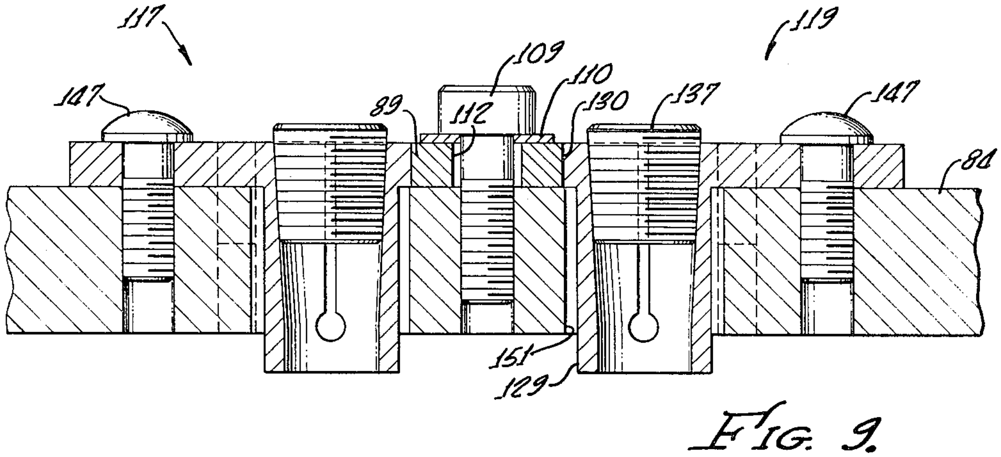
Figures 10, 11:
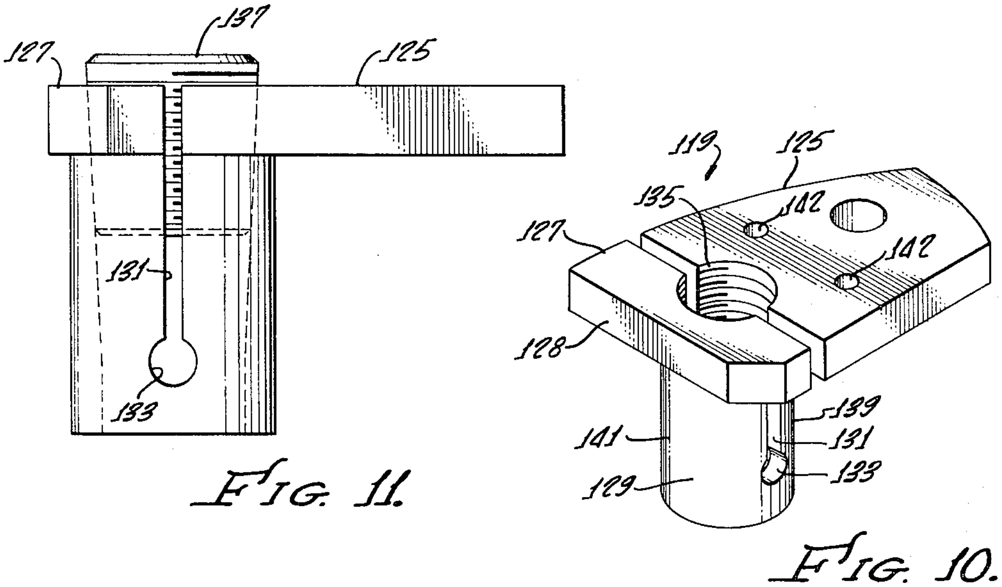
Figure 12:
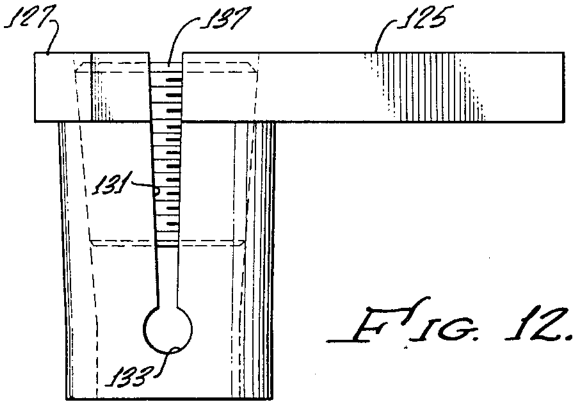
Figures 6, 6A, 7:
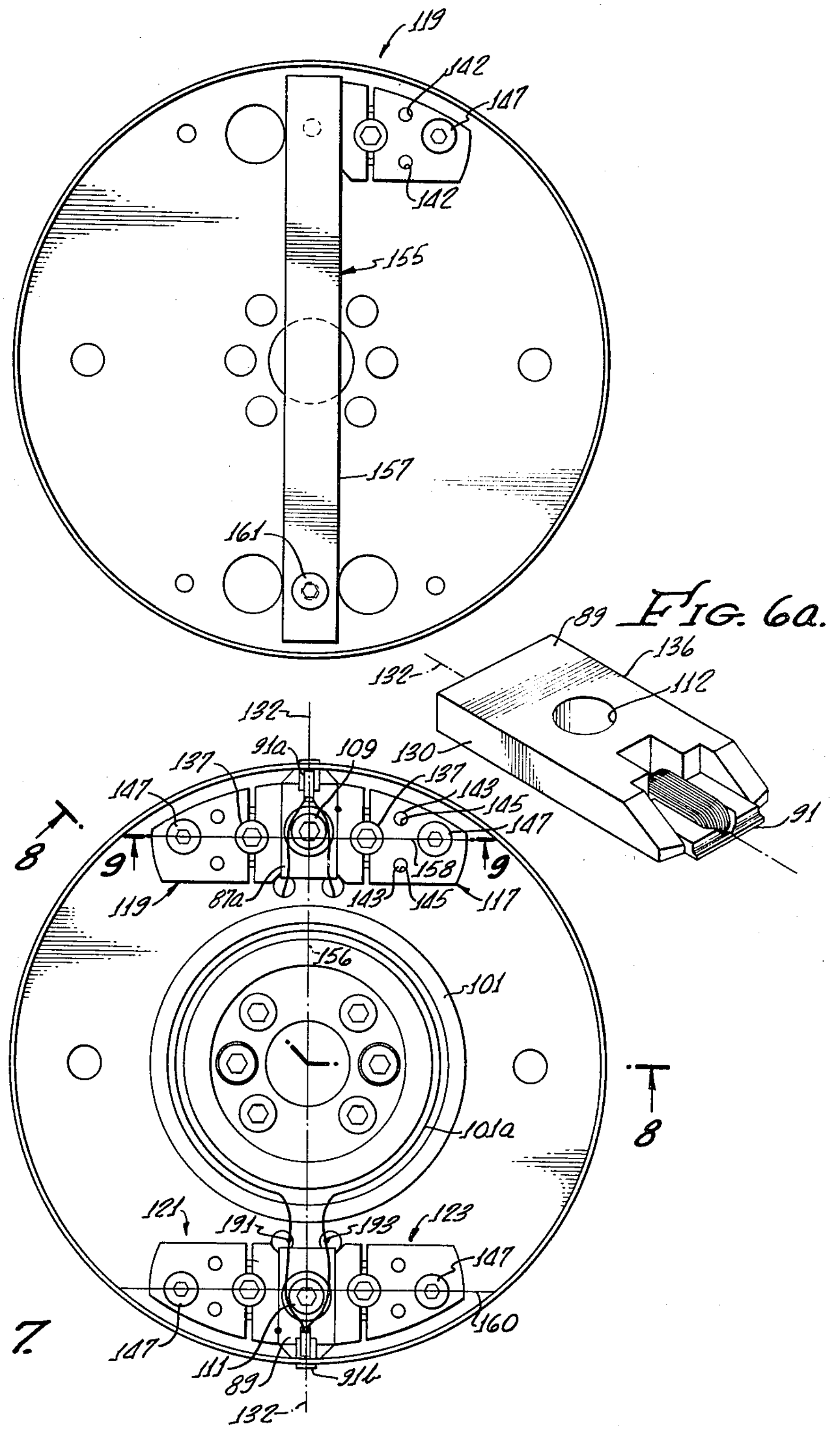
FIG. 6 is a plan view of the scanner disk, with one of the positioning devices of the present invention in place but not yet anchored and with the aligning tool of FIG. 4 also in position.
Figure 13:
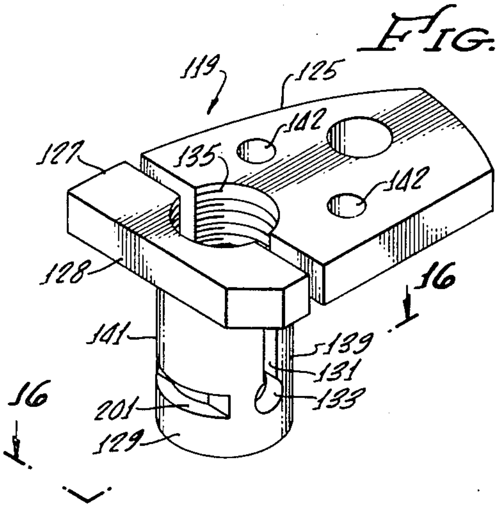
Figure 14:
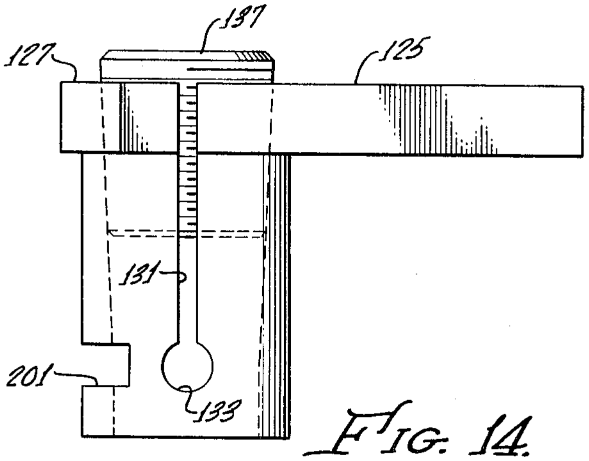
Figure 15:
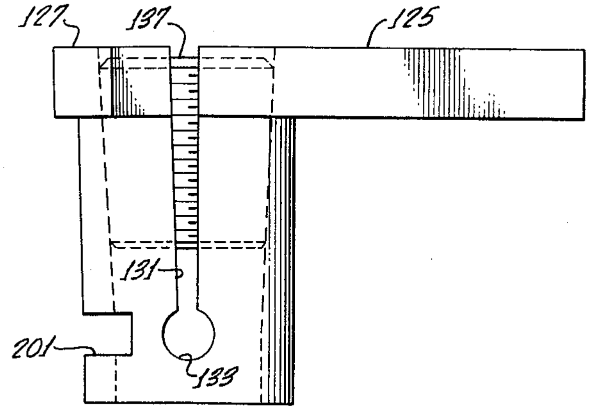
Figure 16:
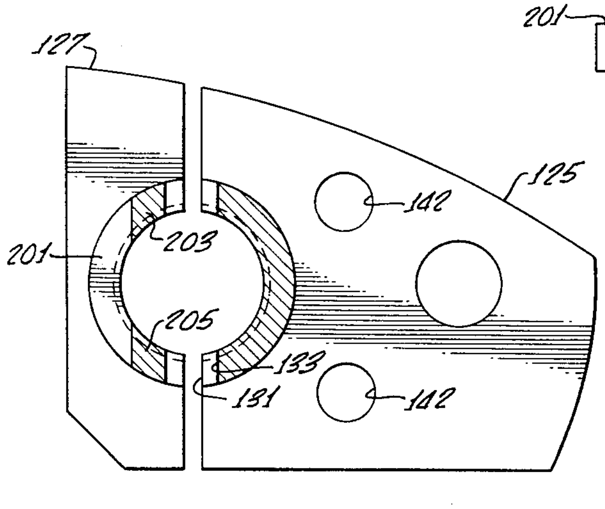

FIG. 6*a* is a perspective view of one of the transducer assemblies;

FIG. 7 is a plan view of the scanner disk, with all of the positioning devices anchored and with the transducer assemblies in position between them;

FIG. 8 is a sectional view taken along line 8—8 of FIG. 7 showing the manner in which the scanner disk is mounted upon its shaft;

FIG. 9 is a sectional view along line 9—9 of FIG. 7 showing the relationship of a pair of the positioning devices and the transducer assembly mounted between them;

FIG. 10 is a perspective view of the split sleeve positioning device of which two are shown in FIG. 9, one on either side of a transducer assembly;

FIG. 11 is a side view of the split sleeve positioning device shown in FIG. 10 with its tapered screw in a first position in which the two arms of the split sleeve have not been spread;

FIG. 12 illustrates the assembly of FIG. 11 with the tapered screw turned further into the split sleeve, causing its arms to be spread apart;

FIG. 13 is a perspective view of a split sleeve device similar to that shown in FIG. 10, but having in addition a transverse slot cut into its sleeve in order to provide greater flexibility in a desired direction;

FIG. 14 is a side view of the device shown in FIG. 13, with its tapered screw in a first position in which the arms of the sleeve have not been spread;

FIG. 15 illustrates the assembly of FIG. 13 with the screw turned further into the sleeve, causing its arms to be spread and one of its arms to be bent about the pivot provided by the material left between the axial and transverse slots; and FIG. 16 is a sectional view along line 16—16 of FIG. 13 showing the depth of the transverse slot in the sleeve of the positioning device.

DETAILED DESCRIPTION OF A PREFERRED EMBODIMENT

Before describing the video tape scanner constructed in accordance with the invention, a helical scan videotape recorder in which the scanner of the present invention may be used will be described briefly with reference to FIGS. 1–3. The tape recorder is housed in a rectangular case 11 having a level top 13 and a raised platform 15. A tape supply reel 17 is mounted on the top 13 and a tape take-up reel 19 is mounted on the platform 15. Each of the reels is mounted for rotation about an axis of a respective hub 21 to transport tape 23 from the supply reel to the take-up reel. Although the transport can be oriented in any direction, for sake of discussion the axes of the reels 17 and 19 will be considered to be vertical. In going from the supply reel 17 to the take-up reel 19 the magnetic tape contacts a guide 25, a supply tape tensioning device 27, a second guide 29, a first magnetic head assembly 31, a first friction surfaced capstan 33, a first straightening post 35, a scanning assembly 37, a second straightening post 39, a second friction surfaced capstan 41, a second magnetic head 43, another guide 45, a take-up tape tension device 47, a fourth guide 49, and then goes on to the take-up reel 19. The scanning assembly 37 includes a rigidly mounted bracket 51, an entry tape guide 53, a drum assembly 55, and an exit tape guide 57.

Figures 1, 2:
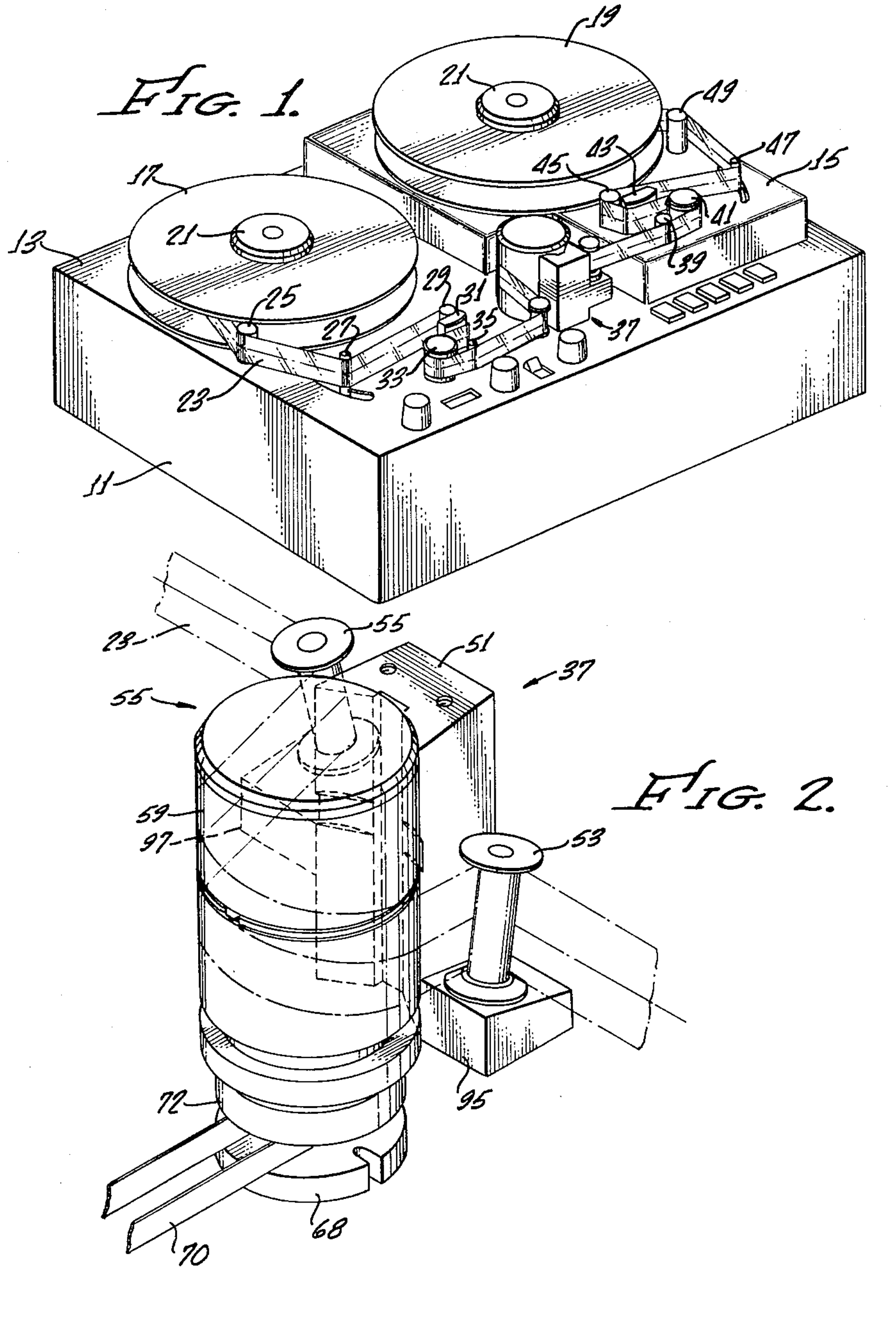
FIG. 1 is a perspective view of a video tape machine with a tape transport including a scanning assembly embodying features of the present invention.
FIG. 2 is a perspective view of the scanning assembly removed from the video tape machine.
Figure 3:
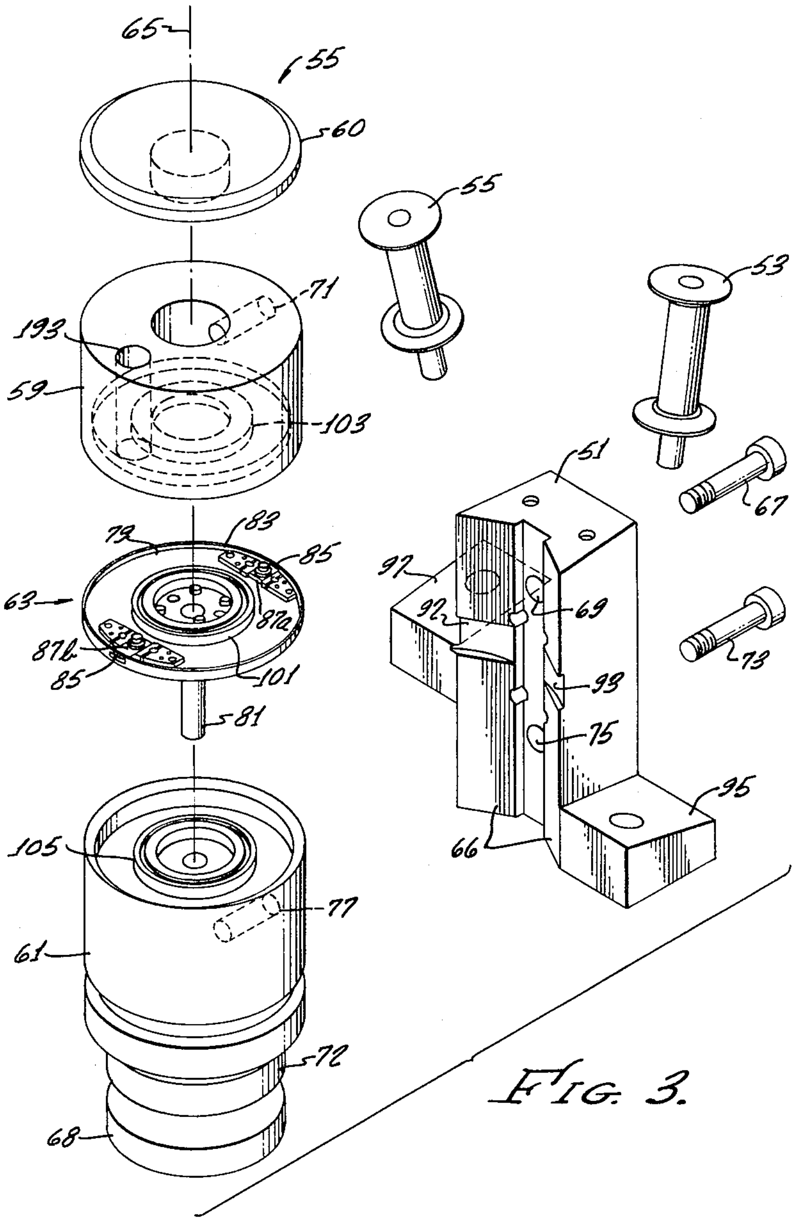
FIG. 3 is an exploded perspective view of the scanning assembly.

As shown in FIGS. 2 and 3 the drum assembly 55 includes an upper male guide 59, a lower male guide 61 and a scanner 63, all having a common vertical axis 65. The male guides 59 and 61 both have cylindrical, low friction surfaces, a part of which serve as a tape guide surface. The upper guide 59, which has a removable cap 60, is bolted against a pair of inclined, vertical surfaces 66 on the bracket 51 by a machine screw 67 which extends through a bore 69 in the bracket and enters a threaded bore 71 in the guide. In a similar manner the lower male guide 61 is bolted against the bracket surfaces 66 by a second machine screw 73 which extends through a bore 75 in the bracket and into a threaded bore 77 in the lower male guide.

The scanner includes a circular plate or disk 79 mounted on the upper end of a shaft 81 which is rotatably mounted in bearings (not shown) in the lower male guide 61. The lower end of the shaft has a flywheel 68 mounted thereon. A belt 70 connected in a pulley groove 72 formed in the flywheel 68 is connected to a motor (not shown) to rotate the scanner.

Figure 4:
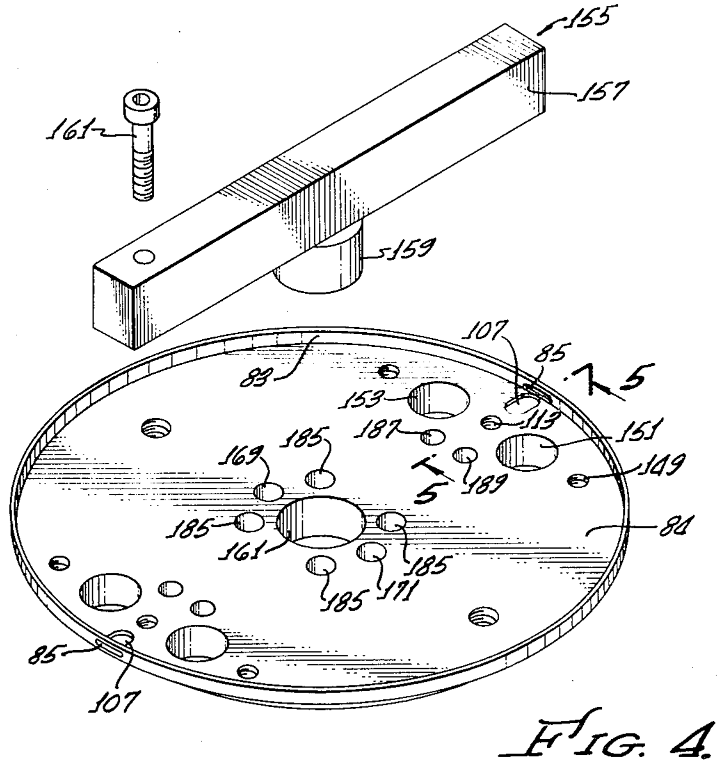
FIG. 4 is a perspective view of the scanner disk and of an aligning tool used to install the positioning devices thereon.

An upwardly extending rim 83 extends around the periphery of the disk 79 above a generally flat top surface 84 and has a pair of openings 85 spaced 180° apart (FIG. 4). A transducer assembly 87 comprised of a mounting shoe 89 and a record-reproduce head 91 (FIG. 7) is mounted upon the flat surface 84 next to each of the openings 85, with the heads 91 extending through the openings to engage the recording tape. A pair of horizontally disposed arcuate recesses 92 and 93 having a common center located on the vertical axis 65 of the drum assembly are provided in the bracket 51 to provide clearance for the heads 91.

To provide an electrical coupling to the record-reproduce heads 91*a* and 91*b* a rotary transformer is provided for each of them. The primary winding 101*a* of the transformer associated with the head 91*a* is mounted in a ferrite ring 101 on the top of the scanner disk 79 and the secondary winding of the same transformer is mounted in a similar ferrite ring 103 on the bottom of the upper male guide 59 directly above the ring 101. Electrical leads connect the transformer primary winding to the head 91, and the transformer secondary winding to appropriate signal processing circuits of the recorder. Signals are similarly fed to and from the other record-reproduce head 91*b* through another transformer, whose primary winding 102*a* is in a ferrite ring 102 mounted on the bottom of the disk 79 directly below the ring 101 (FIG. 8) and whose secondary winding is disposed in a fourth ferrite ring 105 recessed at the top of the bottom male guide 61. A recess 107 extends radially inward from the peripheral openings 85 and under the scanner disk surface to provide room for the leads connecting the heads 91*a* and 91*b* to their respective transformers.

The entry and exit tape guides 53 and 55 are non-rotatably mounted on a pair of ears 95 and 97 which extend outwardly from opposite sides of the bracket 51 and which are integrally formed therewith. The ear 95 is located at the lower end of one side of the bracket 51 while the other ear 97 is located near the midportion of the opposite side. The guides 53 and 55 are so mounted on the ears 95 and 97 as to have their respective axes equally inclined relative to the drum assembly axis 65 but in opposite directions. The angle of inclination of the guides 53 and 55 is selected in accordance with the desired helical path of the tape around the drum assembly. A method and apparatus for precise positioning of the guides 53 and 55 relative to the drum assembly axis 65 is disclosed and claimed in a co-pending application by Alexander R. Maxey for Helical Scanning Assembly for Video Tape Machine, Ser. No. 738,250 assigned to the assignee of the present invention now U.S. Pat. No. 3,516,146.

Referring next to FIGS. 4, 7 and 9 for a detailed consideration of the scanner 63, the transducer assemblies 87*a* and 87*b* are slideably mounted on the flat surface 84 of the scanner disk 79 by machine screws 109 and 111 which extend through washers 110 on top of the head shoes 89 and through oversize bores 112 in the respective head shoes 89 into a pair of threaded bores 113 and 115 in the disk. A pair of positioning devices 117 and 119 are mounted on the scanner disk 79 on opposite sides of the transducer assembly 87*a* and a similar pair of positioning devices 121 and 123 are mounted on opposite sides of the other transducer assembly 87*b*. Since the positioning devices 121 and 123 may be identical with the positioning devices 117 and 119, only the latter will be described in detail. Referring to the positioning device 119 in particular, it includes a first member 125 rigidly anchored to the disk 79 and a second member 127 having a flat positioning surface 128 which abuts a similar reference surface 130 formed by one side of the shoe 89. The shoe 89 is generally rectangular and has an axis of symmetry 132 which extends along a radius of the scanner disk 79 when the shoe is properly mounted thereon (FIGS. 6*a* and 7). The sides of the shoe which run parallel to this axis of symmetry form a pair of reference surfaces 130 and 136.

The two members 125 and 127 are integrally connected to one another by flexible means in such a manner that the second member 127 will move along a chord 158 of the disk 79 when the flexure of the positioning device 119 is changed.

More specifically, in an exemplary embodiment of the invention shown in FIG. 10, the means whereby the second member 127 is flexibly connected to the first member 125 is a sleeve 129 having a split 131 which extends a long part of its length and which terminates in an enlarged stress relief portion 133 near the bottom of the sleeve. A tapped bore 135 is formed between the first and second members 125 and 127 and extends into the sleeve 129. While the tap may be straight, it is preferred that it be tapered. A tap diameter change of 0.25 inches per axial foot has been found to give a proper amount of taper. In the embodiment illustrated in FIG. 10, the entire positioning device 119 is machined from a single block of metal, with the first and second members 125 and 127 being a pair of coplanar blocks which extend outwardly like collars from the upwardly extending arms 139 and 141 of the sleeve 129. The member from which the first and second members 125 and 127 are formed is initially machined as a single plate, with a generally cylindrical member depending from it. The cylindrical member is then drilled and tapped to form the threaded sleeve and a cut is made through the plate and into the sleeve 129 so as to split the plate into the two blocks 125 and 127 and so as to partially split the sleeve 129.

When the screw 137 is not turned fully into the threaded sleeve 129 (FIG. 11) the blocks 125 and 127 will be separated by a distance which corresponds to the distance separating the two upwardly extending arms 139 and 141 of the split sleeve 129. As the tapered screw 137 is turned into the tapered thread 135 between the blocks 125 and 127 they are spread apart (FIG. 12), this being permitted by the flexible connection afforded by the split sleeve 129. Basically, the device shown in FIG. 10 is a fork whose prongs are formed by partially splitting a sleeve. The prongs are integrally attached to a pair of blocks (the positioning block 127 and the anchor block 125) which have a tapered screw threaded between them. The prongs of the fork are flexibly connected at the unsplit end of the sleeve so that the blocks which are attached to them can spread apart when the screw 137 is inserted between them.

When installed on the scanner disk 79, the positioning device 119 is fixed thereon by a pair of dowels 143 and by a machine screw 147 which is received by a threaded bore 149 in the disk. The split sleeve 129 is fully recessed in an opening 151 which extends through the disk 79 on one side of the shoe 89 for that purpose. In order to permit flexing of the split sleeve 129 the diameter of the opening 151 is made larger than the outer diameter of the sleeve. A similar opening 153 is provided on the other side of the shoe 89 to receive the split sleeve of the positioning device 117. The latter device need not be described in detail, since it may be a mirror image of the positioning device 119, as shown in FIG. 7.

It may be noted from FIGS. 11 and 12 that, by making the taper of the screw 137 and the thread 135 of the positioning device 119 the same, the two will be made to engage along several threads, thereby taking fullest advantage of the relatively large number of threads provided by the split sleeve 129. If the sleeve threads 135 were not tapered, the positioning device would not operate as reliably as with a tapered thread because the sleeve threads would only be engaged by a few of the threads of the tapered screw 137. Consequently, any eccentricity in the screw threads would have the effect of causing the spacing between the blocks 125 and 127 to fluctuate as the screw is turned. With the tape thread 135 tapered, and engaging several of the threads of the screw 137, the eccentricity of any given thread is "averaged out" and the blocks 125 and 127 spread evenly and gradually as the screw is advanced. A tapered sleeve thread 135 also has the effect of extending the operative range of the positioning device over that which it would have have if the sleeve threads were not tapered. Thus, if only the screw 137 were tapered, the maximum travel over which its threads could engage those of the sleeve 129 would be the length of the screw, which should be shorter than the length of the sleeve thread 135, as indicated in FIGS. 11 and 12.

In assembling the scanner 63 the positioning devices 117, 119, 121, and 123 may be initially located in their proper place on the disk 84 by means of an aligning tool 155 illustrated in FIG. 4. The tool 155 includes a bar 157 the width of which is exactly the same as that of the head shoe 89. A short cylindrical shaft 159 which is integral with the bar 157 is exactly centered on its bottom face. A reference opening 161 extends through the center of the scanner disk 84 and the shaft 159 is machined to fit into that opening exactly. With the shaft 159 fitted into the opening 161, the rectangular bar portion 157 of the tool 155 extends diametrically across the flat surface 84 of the scanner disk. The length of the bar 157 is such that it fits inside the rim 83 surrounding the disk. The tool 155 is securely attached to the scanner disk 79 by means of a threaded bolt 161 which extends through a bore 163 in the bar portion of the tool into the threaded bore 115 in the scanner disk 79. The threaded bore 115, it will be recalled, is used subsequently to fasten the transducer assembly 87*b* to the scanner disk 79.

With the tool bolted in place, the four positioning devices 117, 119, 121, and 123, with their screws 137 in a partially advanced position, are installed, being held in place only be their fastening bolts 147. FIG. 6 shows the initial stage of this assembly, with only the positioning device 119 being in place. Each positioning device is initially mounted on the scanner disk 79 by abutting its positioning surface 128 against the adjacent surface of the aligning bar 157 and then fastening the anchor block 125 of the positioning device to the scanner disk by means of the bolt 147. When all four of the positioning devices have thus been aligned and mounted on the surface of the disk 79 a pair of dowel holes 145 are drilled through each of their anchor block portions 125 and through the scanner disk 79. Guide holes 142 may be pre-drilled in the anchor blocks 125 as shown in FIG. 10. A dowel 143 is pressed into each dowel hole 145. The aligning tool 155 is then removed and each of the positioning devices is firmly held in position by means of two dowels 145 and a machine screw 147.

Next, the transducer assembly 87a is inserted between the positioning devices 117 and 119 so that the positioning surfaces 130 and 136 of the shoe 89 engage the positioning surfaces 128 of the positioning blocks 127. The transducer assembly 87*b* is installed similarly between its associated positioning devices 121 and 123. The axis of symmetry 132 of each transducer assembly 87 lies along a radius of the disk 79. Their radial positions are set so that their record-produce heads 91 will protrude the peripheral openings 85 by the requisite amount to engage the tape 23. To maintain the transducer assemblies 87 in their proper radial positions each is locked to one of its associated adjusting devices 117, 119, 121, 123 by an epoxy dot applied across the head shoe 89 and positioning block 127 next to it (FIG. 7).

The transducer assemblies 87a and 87b and in particular their head shoes 89 will occupy the same position on the disk 79 as did the aligning tool 155. Consequently, their axes of symmetry 132 will lie on a common diameter 156 of the scanner disk. The reference surfaces 130 and 136 are parallel to this common diameter, as are the positioning surfaces 128 and the splits 131 of the positioning devices 117, 119, 121, and 123. Consequently, as the tapered screws 137 are moved into or out of the threaded split sleeves 129, the positioning blocks 127 move at right angles to the common diameter 156 on which the head shoes 89 are located and along chords 158, 160 of the scanner disk 79 which are at right angles to that common diameter. Therefore, when the position of the heads 91a and 91b are adjusted, they move along the chords 158, 160 so that their gaps do not rotate, but are moved into alignment with and onto the original common diameter 156 on which the head shoes 89 are located. As explained previously, this has the advantage of insuring that the points of tape contact of the head gaps do not move as the heads wear.

It should be noted that the positions of the transducer assemblies 87a and 87b will usually have to be adjusted even though the initial installation with the use of the aligning tool 155 puts their axes of symmetry 132 on a common diameter. There are two reasons for this. First, the precision with which the heads 91a and 91b need to be located is not readily attainable by means of single adjustment with tools such as the tool 155. Secondly, the gaps of the heads 91a, 91b must be positioned on a diameter which extends through the dynamic center of rotation of the disk and this may not coincide exactly with its geometric center, as defined by the opening 161.

After the transducer assemblies 87a and 87b and their associated positioning devices 117, 119, 121 and 123 have been mounted on the scanner disk 79 a subassembly, which includes the scanner disk shaft 81 and the ferrite ring 102, is attached to the bottom of the scanner disk 79. In addition to the shaft 81 and ferrite ring 102 the subassembly includes a bushing 165. The shaft 81 is press-fitted at its upper end into an axial bore 167 in the bushing 165 and the ferrite ring 102 is mounted on the outside surface of the bushing and is held there by adhesive. The bushing 165 is bolted to the underside of the scanner disk 79 by a pair of bolts 168 which are inserted through two openings 169 and 171 in the disk 79 and which engage two of six threaded bores 173 in the wall of the bushing.

With the shaft 81 and the ferrite ring 102 securely attached to the disk 79, a second subassembly which includes the ferrite ring 101, is installed on the top surface 84 of the scanning disk 79. The assembly includes an annular retaining plate 175 having a peripheral shoulder 177 upon which the ferrite ring 101 is mounted and held with adhesive. The plate 175 has six openings. Two of these, the openings 179, serve to provide clearance for the heads of the bolts 168 used to attach the bushing 167 to the plate 79. The other four openings in the plate 175, the openings 181, are in alignment with a corresponding four openings 185 in the disk 79.

To attach the retaining plate 175 to the top surface of the scanner disk 79 and to secure further the bushing 165 to the underside of the disk, four machine screws 183 are inserted through the plate and disk openings 185 and 181 into the remaining four of the six threaded bores 173 in the bushing 165.

To complete the assembly of the scanner 63 the lead-in wires of the record-reproduce head 91a are connected through a pair of openings 187 and 189 to the transformer primary winding 102a in the ferrite ring 102 at the bottom of the scanner disk 79. Similarly, the lead-in wires of the record-reproduce head 91b are connected to the transformer primary winding 101a in the ferrite ring 101 which is on the top of the scanner disk. A pair of insulated terminals 191 and 193 in the disk 79 between the transducer assembly 87a and the ferrite ring 101 serve to facilitate this step. The completed scanner 63 is then installed between the upper and lower male guides 59 and 61, the latter being mounted on the bracket 51 by the bolts 67 and 73 as described earlier. The precise manner in which this assembly is performed need not be described here. It is discussed in detail in the above-referenced co-pending patent application of Alexander R. Maxey.

After the drum assembly comprised of the upper and lower male guides 59 and 61 and of the scanner 63 has been properly mounted on the bracket 51 and the entry and exit tape guides 53 and 55 have been similarly mounted on the bracket, the bracket is secured in place on the top 13 of the recorder. The positioning of the transducer assemblies 87a and 87b in accordance with the invention is ready to begin. The positioning is accomplished by first running the recorder in the record mode and recording a test pattern on the tape through the record-reproduce heads 91a and 91b. The machine is then put in its reproduce mode and the same signal which was recorded is played back. However, each head 91a, 91b is made to reproduce the tracks recorded by the other head. As a result, when the signals which are being played back are observed on a monitoring screen, any deviation of the position of the heads 91a and 91b from the desired 180° spacing will show up as a horizontal shift between successive horizontal bands in the picture which is produced. The direction in which the shift occurs will reveal the direction in which the heads are misaligned.

Let it be assumed that the shift in the reproduced picture is such that the head 91a needs to be moved to the right, as seen in FIG. 7. This can be conveniently achieved in keeping with the invention by simply removing the cap 60 from the top of the top male guide 59 and inserting a tool through an opening 193 which extends through the upper male guide 59. The opening 193 is centered on approximately the same radius as the tapered screws 137 and the retaining bolts 111 to permit the tool to be inserted through the opening into their slots. First, the scanner 63 is turned to bring the tapered screw 137 of a desired one of the two positioning devices 117 and 119 into alignment with the opening 193. The first positioning device to be operated is normally on that side of the transducer assembly 87a toward which the head 91a is to be moved. Assuming this to be the right side, or the surface 130 of the head shoe 89, the tapered screw 137 of the positioning device 117 will be positioned under the opening 193 and will be turned counterclockwise and retracted by the tool inserted therethrough so as to permit the positioning block 127 of that positioning device to move further toward its associated anchor block 125 and away from the head shoe 89.

Next, the scanner is turned slightly clockwise to bring the bolt 111 which holds the transducer assembly 87a on the scanner disk 79 under the opening 193. The bolt is loosened so as to permit the transducer assembly to slide on the surface 84 of the disk toward the positioning device 117.

Finally, the scanner 63 is turned slightly further clockwise to permit the tapered screw 137 of the positioning device 119 to be reached through the opening 193. The screw 137 of the positioning device 119 is turned clockwise, i.e. further into the split sleeve of that positioning device so as to spread its blocks 125 and 127 further apart from one another. This will cause the positioning block 127 of the positioning device 119 to be moved to the right and toward the positioning block 127 of the positioning device 117 until the opposite reference surfaces 130 and 136 of the head shoe 89 are again firmly engaged by the positioning surfaces 128 of both of the positioning devices 117 and 119. The retaining bolt 111 is then tightened to hold the transducer assembly 87a securely in place.

The magnitude of the adjustment may be such as to compensate totally for the initial deviation of the position of the heads 91a and 91b from their ideal locations. Alternatively, the adjustment may be divided between the heads 87a and 87b so that each of them is adjusted by an equal amount in the manner described so as to bring them into proper alignment. After the repositioning of one or both of the heads 91a and 91*b* has been completed, a new test pattern is recorded and that test pattern is played back and observed. If a shift exists, indicating that the heads are still not in their proper positions, the adjustment procedure is again carried out until the reproduced signal indicates that further adjustments are not necessary.

FIGS. 13–16 show an improved version of the exemplary positioning device shown in FIGS. 9–12. It has been discovered during calibration of a scanner 63 having the exemplary positioning device of FIGS. 9–12 that the transducer assembly 87 tends to move axially when the adjusting screw 137 is turned within the sleeve. This is believed to be due to a twisting force transmitted through the threads of the screw 137 and the threads of the sleeve 129 due to their frictional engagement while the arms 139 and 141 of the sleeve are being forced apart. The twisting force is translated into a minute lateral movement of the positioning block 137 relative to the anchor block 125.

To minimize the tendency of the transducer assembly 87 toward radial movement during calibration, the exemplary positioning device was modified in the manner illustrated in FIGS. 13–16. Basically, the arm 141 has been notched so as to make it more flexible, thereby reducing the force necessary to spread it apart from the other arm 139 and, hence also reducing the twisting force tending to move the positioning block 127 laterally relative to the anchor block 125. In the preferred embodiment shown in FIGS. 13–16, the notch is in the form of a slot 201 cut into the wall of the sleeve 129. To gain maximum flexibility in the arm 141 the slot extends through it laterally into communication with the slot 131 so as to form two hinge portions 203 and 205 (FIG. 16) of the wall left between the slots 131 and 201.

FIG. 14 shows the screw 137 in its withdrawn position. The screw is shown inserted into the threaded sleeve 129 in FIG. 15 and it is seen that most of the flexing of the positioning device occurs in two areas. The first area is that between the stress relief portion 133 and the bottom of the sleeve 129. In addition, however, considerable flexing occurs in the left arm 141 about an axis which extends through the hinge members 203 and 205. This additional flexing reduces the force required to force apart the arms 139, 141 and hence minimizes the twisting of the arm 141 relative to the arm 139 that tends to occur when the screw 137 is turned. At the same time, the hinge members 203 and 205 are far enough apart to offer almost as much resistance to twisting as if the slot 201 were not there. In short, by means of the slot 201 the positioning device is made more flexible in the direction in which its arms are to be separated in keeping with the invention, without significantly diminishing its resistance to twisting. The net result is that, by virtue of the slot 201 a given change in the separation between the arms 139, 141 brought about by turning of the screw 137 will be accompanied by a smaller amount of lateral excursion of the positioning block 127 relative to the anchor block 125.

What is claimed is:

1. In a video tape scanner the combination comprising:
   a. a plate mounted for rotation about an axis and having a flat surface normal to said axis;
   b. a transducer assembly slideably mounted on said surface at the periphery of said plate;
   c. flexible positioning means adjacent said transducer assembly and having
      1. a first member rigidly anchored to said plate, and
      2. a second member in contact with said transducer assembly and integrally connected to said first member for providing chordal movement of said transducer assembly along said plate surface when the flexure of said positioning means is altered; and
   d. means for altering the flexure of said positioning means.

2. The combination according to Claim 1 wherein each said positioning means includes a tapped bore between said first and second members and wherein said means for altering the flexure of said positioning means is a screw in each of said tapped bores, with at least one of said bores and said screws being tapered.

3. The combination according to claim 2 wherein said screws are tapered.

4. The combination according to claim 2 wherein said bores and said screws are tapered.

5. The combination in accordance with claim 1 wherein each said positioning means is comprised of a threaded sleeve having a split end at the flat surface of said plate and having an unsplit end away from said surface, and wherein said means for altering the flexure of said positioning means is a screw threadable into said sleeve.

6. The combination of claim 5 wherein each said sleeve extends into said plate through a recess provided therein.

7. The combination according to claim 5 wherein said threaded sleeve and said screws are tapered.

8. The combination in accordance with claim 5 wherein said sleeve is split by a slot extending diametrically through a major portion of said sleeve so as to form two arms connected at the unsplit end of said sleeve and wherein one of said arms has a notch near the unsplit end of said sleeve so as to make said notched arm more flexible.

9. The combination in accordance with claim 8 wherein said notch is a slot which extends laterally through a wall portion of said sleeve into communication with said diametrically extending slot so as to form two hinge portions of the wall left between said slots.

10. A video tape scanner comprising in combination:
   a. a plate mounted for rotation about an axis and having a flat surface normal to said axis;
   b. a pair of magnetic head assemblies slideably mounted on said surface at diametrically opposite points on the periphery of said plate;
   c. a pair of flexible positioning means on opposite sides of each of said magnetic head assemblies each of said positioning means having
      1. a first member rigidly anchored to said plate, and
      2. a second member adjacent said magnetic head assembly and integrally connected to said first member for providing chordal movement of said second member along said plate surface toward and away from said magnetic head assembly, about a pivot point spaced from said surface, when the flexure of said positioning means is altered; and
   d. means for altering the flexure of said positioning means for moving said magnetic head assembly along a chord of said plate.

11. For use in moving a transducer assembly along a chord of a video tape scanner disk, a positioning device comprising an internally threaded sleeve split at one end to form two spaced-apart coextensive arms connected flexibly through the unsplit end of said sleeve, one of said arms having means for anchoring said arm to said disk and the other arm having an extension for abutment against said transducer assembly and being free to move along said chord of said disk so that when a screw is driven into said sleeve said other arm and the position of said transducer assembly is shifted along said chord of said disk.

12. The positioning device of claim 11 wherein said means for anchoring and said extension are coplanar collars integral with respective ones of said arms.

13. The positioning device of claim 11 wherein the thread within said sleeve is tapered.

14. A positioning device in accordance with claim 11 wherein said sleeve is split by a first slot extending diametrically through a major portion of said sleeve and wherein said sleeve is further split by a second slot extending laterally through a wall portion of said sleeve into communication with said first slot so as to form two hinge portions of the wall left between said slots.

15 A drum assembly for a video tape machine comprising in combination:
   a. upper and lower tape guides mounted on a bracket;
   b. a scanner between said tape guides and including 1. a disk mounted for rotation about an axis,
2. a transducer assembly adjustably mounted on said disk,
3. positioning means on at least one side of said transducer assembly and in communication with said transducer assembly for moving said transducer assembly along a chord of said disk; and c. an opening extending through said upper guide parallel to said axis and positioned radially from said axis to provide access to said positioning means and to said transducer assembly.

16. A drum assembly in accordance with claim 15 wherein said positioning means includes a. a body having a pair of flexibly connected spaced-apart members, one of them being next to said transducer assembly and free to move upon said disk, and the other of them being rigidly attached to said disk;
b. a tapped bore in said body; and
c. a tapered screw threadable into said bore for changing the spacing of said members.

17. In a video tape scanner an assembly for accurately positioning a transducer comprising in combination:

a. a disk having a pair of spaced-apart recesses;
b. a pair of positioning blocks, each above a respective one of said recesses and spaced from one another to receive said transducer assembly between them;
c. a pair of anchor blocks fixed upon said disk, each located above a respective one of said recesses adjacent a respective one of said positioning blocks;
d. a coupling member in each said recess for flexibly connecting each said positioning block to its adjacent anchor block; and
e. a tapered screw threadably disposed between each positioning block and its adjacent anchor block to shift along a chord of said disk one positioning block relative to the other as said screw is turned for moving said transducer assembly along a chord of said disk.

18. An assembly in accordance with claim 17 wherein said coupling member is a sleeve split along part of its length into a fork whose prongs are integrally connected to one of said anchor blocks and its adjacent positioning block respectively.

19. An assembly according to claim 18 wherein said transducer assembly has an axis of symmetry along a radius of said disk and a pair of reference surfaces on opposite sides of said axis and parallel thereto for contacting said positioning blocks, each of which has a positioning surface parallel to said axis and facing a respective one of said reference surfaces.

20. An assembly in accordance with claim 18 wherein said sleeves are split along planes which are parallel to a plane defined by the axis of said disk and the axis of symmetry of said transducer assembly.

21. An assembly according to claim 18 wherein said sleeves have an internal tapered thread for receiving said tapered screw.

22. In a video tape scanner the combination comprising:

a. a disk mounted for rotation about an axis and having a pair of spaced-apart recesses on equal radii;
b. a transducer assembly having an axis of symmetry along the radius of said disk between said recesses mounted slideably on said disk;
c. a pair of position blocks, each above a respective one of said recesses and spaced from one another to receive said transducer assembly snugly between them;
d. a pair of anchor blocks fixed upon said disk, each located above a respective one of said recesses adjacent a respective one of said positioning blocks;
e. a two-pronged fork in each said recess, the respective blocks above a given recess being integral with respective ones of the prongs of the fork in said recess; and
f. means between the prongs of each said fork for varying their spread so as to shift the position of said transducer assembly along a chord of said disk.

23. The combination of claim 22 wherein each said fork is a cylinder split along part of its length.

24. The combination of claim 23 wherein each said cylinder is split along a plane that is parallel to the plane defined by the axis of said disk and the axis of symmetry of said transducer assembly.

25. The combination of claim 23 wherein each said cylinder has an internal tapered thread and wherein said means for spreading the prongs of said forks are tapered screws turnable within said internal threads.

26. A video scanner comprising in combination:

a. a disk mounted for rotation about an axis and having a flat surface normal to said axis and a peripheral rim normal to said surface with a pair of openings spaced apart 180°;
b. a pair of transducer assemblies mounted slideably upon said surface near the periphery of said disk, each carrying an electromagnetic transducer protruding through a respective one of said openings;
c. a pair of recesses in said disk on opposite sides of each of said transducer assemblies;
d. a two-pronged fork in each said recess, each fork having one of its prongs in abutment with said transducer assembly and the other of its prongs remote from said transducer assembly and rigidly anchored to said disk; and
e. means in each said fork for gradually varying the spread between its prongs whereby the position of both of said transducers may be shifted along a chord of said disk within their respective openings.

* * * * *

UNITED STATES PATENT OFFICE
CERTIFICATE OF CORRECTION

Patent No. 3,679,838 Dated July 25, 1972

Inventor(s) Guido Salcedo; Jimmy J. Graves, deceased - Marlene D. Graves, heir

It is certified that error appears in the above-identified patent and that said Letters Patent are hereby corrected as shown below:

Col. 1, line 27, change "leave" to "leaves".

Col. 6, line 48, change "be" to "by";

Col. 6, line 73, between "protrude" and "the", insert --through--.

Col. 7, line 75, change "87a" to "87b".

Signed and sealed this 10th day of April 1973.

(SEAL)
Attest:

EDWARD M.FLETCHER,JR.
Attesting Officer

ROBERT GOTTSCHALK
Commissioner of Patents